(12) United States Patent
Poulet et al.

(10) Patent No.: US 12,012,516 B2
(45) Date of Patent: Jun. 18, 2024

(54) DEHYDRATED BINDERS IN SOLID FORM, PRODUCTION METHOD THEREOF, AND METHOD FOR REHYDRATING SAME

(71) Applicant: NOF METAL COATINGS EUROPE, Creil (FR)

(72) Inventors: Jean-Marie Poulet, Senlis (FR); Didier Labouche, Saint Amand les Eaux (FR); Stéphanie Bruyere, Villers Sous Saint-Leu (FR)

(73) Assignee: NOF METAL COATINGS EUROPE, Creil (FR)

( * ) Notice: Subject to any disclaimer, the term of this patent is extended or adjusted under 35 U.S.C. 154(b) by 788 days.

(21) Appl. No.: 16/766,815

(22) PCT Filed: Nov. 28, 2018

(86) PCT No.: PCT/EP2018/082884
§ 371 (c)(1),
(2) Date: May 26, 2020

(87) PCT Pub. No.: WO2019/106037
PCT Pub. Date: Jun. 6, 2019

(65) Prior Publication Data
US 2021/0017398 A1    Jan. 21, 2021

(30) Foreign Application Priority Data

Nov. 28, 2017  (FR) ...................................... 1761267

(51) Int. Cl.
| | | |
|---|---|---|
| *C09D 1/00* | (2006.01) | |
| *C08K 3/22* | (2006.01) | |
| *C08K 5/5419* | (2006.01) | |
| *C09D 5/08* | (2006.01) | |
| *C09D 7/63* | (2018.01) | |

(52) U.S. Cl.
CPC .................. *C09D 1/00* (2013.01); *C08K 3/22* (2013.01); *C08K 5/5419* (2013.01); *C09D 5/08* (2013.01); *C09D 7/63* (2018.01); *C08K 2003/2237* (2013.01); *C08K 2003/2244* (2013.01)

(58) Field of Classification Search
None
See application file for complete search history.

(56) References Cited

U.S. PATENT DOCUMENTS

| | | | | |
|---|---|---|---|---|
| 3,687,882 A | * | 8/1972 | Bishop | ................... C23C 22/68 528/30 |
| 5,200,237 A | | 4/1993 | Sugama | |
| 6,404,068 B1 | * | 6/2002 | Tanaka | ................. C09D 177/00 257/E23.125 |
| 8,431,646 B2 | | 4/2013 | Giessler-Blank et al. | |
| 9,150,733 B2 | * | 10/2015 | Iandoli Espinosa | ... C09D 5/086 |
| 2005/0008763 A1 | * | 1/2005 | Schachter | ............. A61L 29/085 427/2.24 |
| 2005/0048296 A1 | * | 3/2005 | Meguriya | ............... B32B 25/20 428/447 |

FOREIGN PATENT DOCUMENTS

| | | |
|---|---|---|
| CN | 102911543 | 2/2013 |
| WO | WO2005078026 A1 | 8/2005 |

\* cited by examiner

*Primary Examiner* — Stefanie J Cohen
(74) *Attorney, Agent, or Firm* — Mark Bandy; Rankin Hill & Clark, LLP

(57) ABSTRACT

The present invention relates to a water-rehydratable solid composition for the production of an aqueous composition comprising a silane/(titanate and/or zirconate) binder, a method for producing such a composition, and a method for producing an aqueous composition comprising a silane/titanate and/or zirconate) binder by hydrating such it solid composition.

20 Claims, No Drawings

DEHYDRATED BINDERS IN SOLID FORM, PRODUCTION METHOD THEREOF, AND METHOD FOR REHYDRATING SAME

The present invention concerns dehydrated binders in solid form, a process for obtaining them and their rehydration for the preparation of an aqueous composition comprising a binder.

Binders are known which are used in particular for the preparation of aqueous compositions for the preparation of anti-corrosion coatings.

For example, the Applicant described in its application WO2005/078026 an anti-corrosion coating composition for metal parts based on particulate metal in aqueous dispersion comprising an organic titanate or zirconate compatible in aqueous or organic phase, optionally a silane-based binder, and water.

The invention now provides dehydrated binders which, in particular, reduce the storage volume and increase the life of the sol-gel binder.

The invention has as its first subject matter a water-hydratable solid composition, intended for the preparation of an aqueous composition comprising a binder based on silane and titanate and/or zirconate, said solid composition being based on a titanate precursor and/or a zirconate precursor and a silane bearing at least one function hydrolyzable to a hydroxyl function with a (Ti+Zr)/Si molar ratio ranging from 10/90 to 60/40. Surprisingly, it has been found that one of the essential conditions for rehydration of the solid composition is that it is based on a precursor of titanate Ti and/or zirconate Zr. Advantageously, the solid composition is based on a precursor of titanate Ti.

For the purposes of the present invention, "precursor" means a chemical reagent which initiates a reaction. It is often an alkoxide (alkoxide of the formula M(OR)n: where M is a metal, for example Ti, Zr or Si, and R is an organic alkyl group CnHn-1) or a metal salt.

For the purposes of the present invention, "titanate precursor" means a compound comprising at least one titanium atom and capable of forming covalent bonds between themselves or with the other precursors, including the silicon precursors silane and silicate, to form a binder.

For the purposes of the present invention, "zirconate precursor" means a compound comprising at least one zirconium atom and capable of forming covalent bonds between themselves or with the other precursors, including the silicon precursors silane and silicate, to form a binder.

For the purposes of the present invention, "silane" means an organic compound comprising at least one Si atom with at least one Si—C bond. In a silane, the bonds to the silicon atom, in addition to the Si—C bond, are generally Si—O, Si—Si or Si—H bonds, more advantageously Si—O.

For the purposes of the present invention, "silicate" means an organic or inorganic compound, advantageously organic, comprising at least one Si atom without Si—C bonds. In a silicate, the bonds with the silicon atom are generally Si—O, Si—Si or Si—H bonds, more advantageously Si—O.

For the purposes of the present invention, "particle size" means the maximum dimension of the particle under consideration.

For the purposes of the present invention, "composition based on" means a composition comprising the mixture and/or the product of in situ reaction of the various basic constituents used, some of these constituents being capable of reacting and/or being intended to react with each other, at least partially, during the various phases of preparation of the composition, or during subsequent baking, modifying the composition as it is prepared at the outset. Thus, the compositions as used for the invention may be different in the non-cross-linked state and in the cross-linked state.

For the purposes of the present invention, "solid composition" means a composition in the form of a hard gel or in powder form. In a particular embodiment, the solid composition is obtained by dehydration of an aqueous composition. The solid composition is rehydratable with water and can be used in particular for the preparation of an anti-corrosion coating composition for metal parts based on particulate metal in aqueous dispersion.

For the purposes of the present invention, "aqueous composition" means an aqueous composition based on a titanate precursor and/or a zirconate precursor and a silane bearing at least one function hydrolyzable to a hydroxyl function according to the invention, which is intended to be dehydrated to give the solid composition according to the invention.

For the purposes of the present invention, "coating composition" means a composition in aqueous dispersion, intended to be applied to a substrate, in particular a metallic substrate, and then subjected to a baking operation in order to give the coating. The coating composition consists of the rehydrated solid composition, optionally a particulate metal and optionally other compounds being added to this composition.

For the purposes of the present invention, the "coating" is therefore obtained by applying the coating composition to a substrate, in particular a metallic substrate, the coating layer then being subjected to a baking operation. The terms "coating", "anti-corrosion coating" and "dry coating film" are used synonymously in this application.

For the purposes of the present invention, "dry matter content" means the content of the residue obtained by evaporation of the solvents and volatile matter contained in the initial aqueous composition or the initial coating composition; evaporation being advantageously carried out in an oven for 1 h at 180° C. The dry matter content is expressed as a percentage by weight based on the total weight of the initial aqueous composition or initial coating composition.

The (Ti+Zr)/Si molar ratio varies advantageously from 10/90 to 60/40, more advantageously from 20/80 to 50/50, even more advantageously from 25/75 to 50/50.

The source of silicon is silane, but can also be partly silicate. When a silicate is also present, the silane is nevertheless predominant in terms of moles.

The source of Ti is advantageously an organic titanate. The source of Zr is advantageously an organic zirconate.

When the composition does not include zirconate, the Ti/Si molar ratio varies advantageously from 10/90 to 60/40, more advantageously from 20/80 to 50/50, even more advantageously from 25/75 to 50/50.

The solid composition is advantageously in gel or powder form, with particle sizes ranging from about 2 μm to about 3 mm.

The titanate precursor is advantageously an organic titanate.

In a first, preferred embodiment, the organic titanate is selected from $C_1$-$C_{10}$ tetraalkyl titanates, advantageously $C_1$-$C_8$ tetraalkyl titanates. They can be represented by the following formula (I):

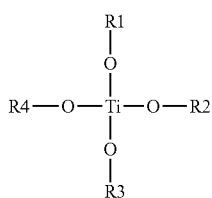

(I)

wherein R1, R2, R3 and R4 independently represent an optionally substituted $C_1$-$C_{10}$, preferably $C_1$-$C_8$, alkyl radical. The $C_1$-$C_{10}$ tetraalkyl titanate advantageously $C_1$-$C_8$ tetraalkyl titanate is advantageously selected from the group consisting of tetraethyl titanate (TET, $Ti(OC_2H_5)_4$), tetra-n-butyltitanate ($T_nBT$, $Ti(OC_4H_9)_4$), tetra-isopropoxytitanate ($Ti(OCH(CH_3)_2)_4$), tetra-n-propoxytitanate ($Ti(OCH_2CH_2CH_3)_4$) and octylene glycoltitanate (OGT, $TI(O_2C_8H_{17})_4$).

In a second embodiment, the organic titanate is selected from organic titanates in chelate form that are not compatible with water (compatible in the organic phase), in particular titanium acetylacetonate and diisopropoxy-bisethyl-acetoacetato titanate, marketed by Dorf Ketal under the names TYZOR® AA (titanium acetylacetonate), and TYZOR® DC (diisopropoxy-bisethylacetoacetato titanate).

In a third embodiment, the organic titanate is selected from among the chelated titanates compatible in aqueous phase, which can advantageously be represented by the following general formula (II):

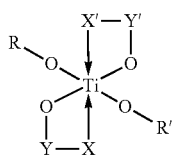

(II)

wherein R and R' independently represent an optionally substituted $C_1$-$C_{10}$, preferably $C_1$-$C_8$ alkyl radical, X and X' independently represent a functional group comprising an oxygen or nitrogen atom, and Y and Y' independently represent a hydrocarbon chain having 1 to 4 carbon atoms. X and X' advantageously represent an amino or lactate radical.

The organic titanate in chelate form compatible in aqueous phase is advantageously selected from the group consisting of triethanolamine titanates (TYZOR© TE and TEP marketed by Dorf Ketal). As an example of organic titanates in chelate form compatible in aqueous phase, mention may also be made of alkanolamine titanate in chelate form and titanate-lactic acid chelate, marketed by Dorf Ketal under the names TYZOR® TA (alkanolamine titanate in chelate form) and TYZOR® LA (titanate-lactic acid chelate).

The zirconate precursor is advantageously an organic zirconate.

In a first, preferred embodiment, the organic zirconate is selected from $C_1$-$C_{10}$ tetraalkyl zirconates, advantageously $C_1$-$C_8$ tetraalkyl zirconates, which can advantageously be represented by the following formula (III):

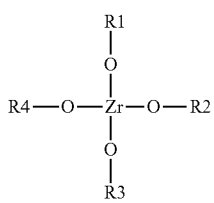

(III)

wherein R1, R2, R3 and R4 independently represent an optionally substituted $C_1$-$C_{10}$, preferably $C_1$-$C_8$, alkyl radical. The tetra-$C_1$-$C_{10}$-alkyl zirconate, advantageously tetra-$C_1$-$C_8$-alkyl zirconate, is advantageously selected from the group consisting of tetra-n-propyl zirconate and tetra-n-butyl zirconate.

In a second embodiment, the organic zirconate is selected from organic zirconates in chelate form that are not compatible with water (compatible in the organic phase), in particular diethyl zirconate chelate marketed by Dorf Ketal under the name TYZOR® ZEC.

In a third embodiment, the organic zirconate is selected from among the zirconate chelates compatible in aqueous phase, which can advantageously be represented by the following general formula (IV):

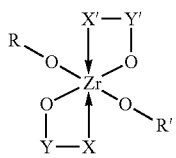

(IV)

wherein R and R' independently represent an optionally substituted $C_1$-$C_{10}$, preferably $C_1$-$C_8$, alkyl radical, X and X' independently represent a functional group comprising an oxygen or nitrogen atom, and Y and Y' independently represent a hydrocarbon chain having 1 to 4 carbon atoms. X and X' advantageously represent an amino radical.

The organic zirconate chelate can advantageously be triethanolamine zirconate (TYZOR® TEAZ marketed by Dorf Ketal). An example of organic zirconate in a chelate form that is compatible in aqueous phase is the zirconate-lactic acid chelate marketed by Dorf Ketal under the name TYZOR® LAZ.

The titanate precursor is advantageously an organic titanate, more advantageously selected from $C_1$-$C_8$ tetraalkyl titanates, and the zirconate precursor is advantageously an organic zirconate, more advantageously selected from $C_1$-$C_8$ tetraalkyl zirconates.

The silane carries at least one function hydrolyzable to a hydroxyl function, advantageously selected from a $C_1$-$C_4$, preferably $C_1$-$C_2$, alkoxy radical.

The expression "function hydrolyzable to a hydroxyl function" means any chemical function that can react with water to become a hydroxyl-OH function.

The silane advantageously carries three, preferably identical, functions hydrolyzable to hydroxyl functions.

The silane carries at least one, advantageously one, hydrocarbon radical, connected to the silicon atom by one of its carbon atoms. This hydrocarbon radical may also include heteroatoms or halogens, advantageously heteroatoms. This hydrocarbon radical can be linear, branched or even comprise a ring. This hydrocarbon radical can advantageously comprise up to 10 carbon atoms, more advantageously from 4 to 10 carbon atoms.

In a preferred variant, the silane also carries an epoxy function (oxirane), which promotes cross-linking and adhesion to the substrate. Thus, the hydrocarbon radical advantageously contains an epoxy function.

The silane is advantageously easily dispersed in the aqueous medium and is preferably soluble in such a medium.

The silane used is advantageously an epoxy-functional silane selected from epoxy-functional di- or trimethoxysilane and epoxy-functional di- or triethoxysilane and mixtures thereof, in particular as beta-(3,4-epoxycyclohexyl) ethyltrimethoxysilane, 4-(trimethoxysilyl)butane-1,2-epoxide or gamma-glycidoxypropyltrimethoxysilane or gamma-glycidoxypropyltriethoxysilane. The silane used may also advantageously be octyltriethoxysilane, phenyltriethoxysilane, methyltriethoxysilane, (2-diethylphosphatoethyl) triethoxy silane, vinyltriethoxysilane, 3-Aminopropyltriethoxysilane, methylmethacrylate trimethoxysilane, methyl methacrylate triethoxysilane and mixtures thereof.

The solid composition may also include a silicate. This silicate is also a source of Si. The silicate is advantageously an alkoxide of silicon, in particular tetraethyl orthosilicate ($Si(OC_2H_5)_4$ and called TEOS).

The solid composition according to the invention is advantageously obtained by dehydration of an aqueous composition into which said titanate precursor and/or said zirconate precursor, said silane, optionally said silicate, and water have been introduced.

Dehydration can be carried out by any means known to the person skilled in the art such as freeze-drying, zeodration, spray drying or vacuum evaporation. Advantageously the solid composition is obtained according to the process described below.

For the purposes of the present invention, "aqueous composition" means a composition comprising water as the predominant solvent, by weight.

In the present invention, said aqueous composition advantageously comprises at least 25% by weight, based on the total weight of said aqueous composition, of water, more advantageously at least 32% by weight of water.

The aqueous composition is based advantageously on 20 to 40% by weight, more advantageously 20 to 34% by weight, based on the total weight of the aqueous composition, of said silane. This amount corresponds to the amount of said silane introduced during the preparation of the aqueous composition. Once all the compounds of the aqueous composition have been introduced, they can/will react with each other to form new compounds, we will then speak in amount of Si elements.

The aqueous composition is based advantageously on 0 to 5% by weight, more advantageously 0 to 3.5% by weight, based on the total weight of the aqueous composition, of said silicate. This amount also corresponds to the amount of said silicate introduced during the preparation of the aqueous composition.

Thus, in the solid composition according to the invention, the content of Si elements (atomic mass=28 g/mol) is advantageously between 5 and 15%, advantageously between 6 and 11% by weight based on the total weight of the solid composition.

The aqueous composition is based advantageously on 2 to 55% by weight, more advantageously on 9 to 25% by weight, based on the total weight of the aqueous composition, of said titanate precursor, said zirconate precursor or a mixture thereof. This amount corresponds to the amount introduced of said titanate precursor, said zirconate precursor or their mixture during the preparation of the aqueous composition. Once all the compounds of the aqueous composition have been introduced, they can/will react with each other to form new compounds, we will then speak in amount of Ti elements and/or Zr elements.

Thus, in the solid composition according to the invention, the content of Ti elements (atomic mass=48) and/or the element Zr (atomic mass=91 g/mol) is advantageously between 1.5 and 35%, advantageously between 2.5 and 30% by weight, based on the total weight of the solid composition. In an advantageous variant, the solid composition does not comprise a zirconate precursor and the content of Ti elements (atomic mass=48 g/mol) is advantageously between 1.5 and 16%, advantageously between 2.5 and 15% by weight based on the total weight of the solid composition.

It was found that the solid composition was subsequently more easily rehydratable when the initial aqueous composition also included a heavy organic solvent, an ionic liquid, or mixtures thereof.

Thus, in an advantageous embodiment of the invention, the solid composition is obtained by dehydration of the aqueous composition described above, further comprising a heavy organic solvent, an ionic solvent, or mixtures thereof. In particular, said aqueous composition comprises from 0.5 to 15% by weight, based on the total weight of said aqueous composition, of heavy organic solvent, ionic liquid, or mixtures thereof. "Heavy organic solvent" in the context of the present invention means a water-miscible organic solvent whose vapor pressure at 20° C. is preferably less than 4 mmHg, advantageously less than 2 mmHg.

Particular examples of heavy organic solvents that can be used include glycol solvents such as glycol ethers, in particular diethylene glycol, triethylene glycol and dipropylene glycol, acetates, propylene glycol, polypropylene glycol, alcohols, ketones, propylene glycol methyl ether, 2,2,4 trimethyl pentanediol (1,3) isobutyrate (Texanol), white spirit and mixtures thereof.

Dipropylene glycol is particularly advantageous, in particular for economic and environmental reasons.

As a heavy organic solvent, esters such as ethyl lactate, methyl oleate or methyl or ethyl fatty acid esters can also be used. Ionic liquids are salts having a melting temperature below 100° C. as described in the work "Electrodeposition from Ionic Liquids" edited by Frank Endres, Douglas MacFarlane, and Andrew Abbott, and, in the context of the present invention, below room temperature. The cations are generally of the dialkylimidazolium, tetraalkylammonium, tetraalkylphosphonium or alkylpyridium type. The anions are generally of the tetrafluoroborate, hexafluorophosphate, halide, mesylate, tosylate, triflate or acetate type.

The solid composition according to the invention can then be rehydrated, without difficulty, advantageously with stirring, to give an aqueous composition comprising a silane/(titanate and/or zirconate) binder. This silane/(titanate and/or zirconate) binder can subsequently be used, for example, for the preparation of a coating composition.

Surprisingly, it was found that a solid composition based on a silicon precursor and a titanate precursor could easily be rehydrated whereas a solid composition based only on a silicon precursor could not be rehydrated.

Rehydration is conducted by adding water, advantageously under stirring. In addition to water, a heavy organic solvent or an ionic liquid may also be added, in proportions by weight corresponding to those described above for the initial aqueous composition, advantageously in an amount less than or equal to 15% by weight, thus ranging from 0% to 15% by weight, based on the total weight of the water+(heavy organic solvent, ionic liquid and mixtures thereof) mixture. The amount of water, and optionally of heavy organic solvent or ionic liquid, added generally corresponds to the amount of liquid that was present in the initial aqueous composition, in order to achieve the same dry matter content. In another embodiment, the amount of water, and optionally of heavy organic solvent or ionic liquid, added may be higher than the amount of liquid which was present in the initial aqueous composition to increase stability after rehydration. Thus, the initial aqueous composition can be more concentrated to increase productivity during dehydration and be rehydrated to a lower dry matter content to obtain a good stability of the final composition.

The targeted dry matter content varies advantageously from 10 to 35%, more advantageously from 20 to 25%. The rehydrated aqueous composition is stable, at least as stable as the original aqueous composition, if not more stable.

The present invention also has as its subject matter a process for preparing a solid composition according to the invention, comprising a step of dehydration of an aqueous composition based on said titanate precursor and/or said zirconate precursor, said silane, optionally said silicate, and water, as defined above.

In a first embodiment, dehydration is carried out by freeze-drying.

Freeze-drying is a particularly well-known method for the low-temperature vacuum drying of previously frozen liquid products. Freeze-drying consists of the gradual removal of water from the previously frozen product by sublimation.

In this first embodiment, the process comprises a step of freezing said aqueous composition and then a step of freeze-drying.

Said aqueous composition can for example be frozen by the use of liquid nitrogen.

Freeze-drying is advantageously carried out at a temperature between −70° C. and −90° C., advantageously −80° C., and at a pressure between 0.05 mbar and 0.3 mbar, advantageously between 0.1 mbar and 0.26 mbar.

In a second embodiment, dehydration is carried out by zeodration.

The zeodration process is a vacuum drying method in the presence of a zeolite bed. It does not require a freezing step.

In a third embodiment, dehydration is carried out by vacuum evaporation, advantageously at a temperature close to room temperature.

The vacuum evaporation process is a well-known method of evaporating water at a temperature significantly lower than the standard boiling temperature.

In the present invention, vacuum evaporation is advantageously carried out at a temperature below 60° C., more advantageously from 35° C. to 50° C. The vacuum can be obtained for example with a pressure ranging from 15 mbar to 25 mbar.

Alternatively, dehydration can be achieved by spray drying. Spray drying is a method of dehydrating a liquid in powder form by passing it through a stream of hot air. Advantageously, in the context of the present invention, the spray drying parameters are determined to obtain a powder temperature lower than 60° C., more advantageously ranging from 35° C. to 50° C.

Once the solid composition is obtained by dehydration by a suitable method, in particular one of the four methods described above, the process may include a step of reducing the size of the powder particles, for example by mechanical action.

This optional action on the solid particles obtained can be used to adjust the fineness of the desired powder. This step will affect the bulk density of the powder obtained and may accelerate the subsequent rehydration step.

According to another embodiment, once the solid composition is obtained, by dehydration according to a suitable method, in particular by spray drying, the process may include a granulation step to increase the size of the powder particles. This step will also affect the apparent density of the powder obtained and may accelerate the subsequent rehydration step.

The preparation of a solid composition, easily rehydratable, makes it possible in particular to reduce storage volumes. It also makes it possible to increase the lifetime of the silane/(titanate and/or zirconate) binder since the solid composition is substantially less sensitive to degradation than an aqueous composition and that, after hydration, the aqueous composition obtained is at least as stable as the aqueous composition which has not been subjected to the process according to the invention.

The invention also relates to a process for preparing an aqueous composition comprising a binder based on silane and titanate and/or zirconate comprising a step of hydration of a solid composition according to the invention or obtained by the process according to the invention.

Hydration, more precisely rehydration, is conducted by adding water, advantageously under stirring. In addition to water, a heavy organic solvent or an ionic liquid may also be added, in mass proportions corresponding to those described above for the initial aqueous composition, advantageously in an amount less than or equal to 15% by weight, thus ranging from 0% to 15% by weight, based on the total weight of the water+(heavy organic solvent, ionic liquid and mixtures thereof) mixture. The amount of water, and optionally of heavy organic solvent or ionic liquid, added generally corresponds to the amount of liquid that was present in the initial aqueous composition, in order to achieve the same dry matter content. According to another embodiment of the invention, the initial aqueous composition may be more concentrated to increase productivity during dehydration and be rehydrated to a lower dry matter to obtain a good stability of the final composition.

The targeted dry matter content varies advantageously from 10 to 35%, more advantageously from 20 to 25%.

The rehydrated aqueous composition is stable, at least as stable as the original aqueous composition, if not more stable.

The rehydrated aqueous composition comprising the binder based on silane and titanate and/or zirconate is particularly suitable for the preparation of an anti-corrosion coating composition for metal parts based on particulate metal in aqueous dispersion as described in application WO2005/078026.

In particular, such a coating composition comprises a particulate metal.

The particulate metal of the coating composition may be selected from the group consisting of metallic pigments such as aluminum, manganese, nickel, titanium, stainless steel, zinc, their alloys and mixtures thereof. The particulate metal is advantageously selected from zinc and aluminum and their alloys and mixtures thereof or their alloys with manganese, magnesium, tin or Galfan. The particulate metal present in the composition is advantageously in powder form, of various homogeneous or heterogeneous geometric structures, including spherical, lamellar, lenticular or other specific shapes. The particulate metal advantageously has a particle size of less than 100 μm, even more advantageously less than 40 μm.

Where the particulate metal is an alloy or mixture of zinc and aluminum, aluminum may be present in very small amounts, for example 1 to 5% by weight of the particulate metal, but still provide a shiny coating. Usually aluminum accounts for less than 10% by weight of the particulate metal, so the weight ratio of aluminum to zinc is of the order of 0.5:9.5. On the other hand, for reasons of economy, aluminum accounts for no more than about 50% by weight of zinc and total aluminum, so the weight ratio of aluminum to zinc can be as high as 1:1. The particulate metal content of the coating composition will not exceed about 40% by weight of the total weight of the composition to maintain the best coating appearance and will usually be at least 10% by weight to achieve a shiny coating.

The coating composition advantageously comprises from 10 to 40% by weight, based on the total weight of the coating composition, of said particulate metal.

This coating composition is particularly suitable for the preparation of an anti-corrosion coating for metal parts. The coating is obtained by applying the coating composition to a substrate, in particular a metallic substrate, advantageously by spraying, dip-draining or dip-centrifuging, the coating layer then being subjected to a baking operation conducted preferably at a temperature of between 120° C. and 350° C., for about 10 to 60 minutes, by supplying thermal energy, such as by convection or infrared, or for about 30 seconds to 5 minutes by induction.

In particular, the anti-corrosion coating will result from an application operation involving, prior to a baking operation, an operation of drying the coated parts, advantageously metallic, by the supply of thermal energy, such as by convection, infrared or induction, at a temperature of between 30 and 250° C., advantageously of the order of 70° C., in convection or infrared for 10 to 30 minutes on line or for about 30 seconds to 5 minutes by induction. Prior to coating, it is advisable in most cases to remove foreign matter from the substrate surface, particularly by careful cleaning and degreasing. Under these conditions, the thickness of the dry coating film thus applied is advantageously between 3 μm (11 g/m$^2$) and 30 μm (110 g/m$^2$) and preferably between 4 μm (15 g/m$^2$) and 12 μm (45 g/m$^2$), more particularly between 5 μm (18 g/m$^2$) and 10 μm (40 g/m$^2$).

The substrate is advantageously metallic, preferably steel or steel coated with zinc or a zinc-based layer deposited by various application methods including mechanical deposition, to cast iron and aluminum.

The metallic substrate can be pre-treated, for example by chromate or phosphate treatment. Thus, the substrate can be pre-treated to have, for example, an iron phosphate coating in an amount of 0.1 to 1 g/m$^2$ or a zinc phosphate coating in an amount of 1.5 to 4 g/m$^2$.

EXAMPLES

The following examples show ways in which the present invention may be implemented, but do not in any way limit the present invention.

Gel Phase Chromatography (GPC)

The analysis conditions are as follows:

Eluent=water–Flow rate=0.8 mL/min–Dilution=1 qs 60–Injection=100 μL—Detector: Refractive Index at 35° C.—TSK Gel type columns thermostatted at 40° C.: 1 pre-column+2 columns G2500PWXL+1 column G3000 PWXL+1 column G4000 PWXL.

Viscosity

Measurement of a flow time with a DIN 4 type consistometric cup.

Preparation of the Test Panels:

Unless otherwise specified, test panels are typically cold rolled low carbon steel panels. They may be prepared first by immersion in a cleaning solution. The panels may then be scrubbed with a cleaning pad, rinsed with water and then immersed again in the cleaning solution. After removing the solution, the panels are rinsed with tap water and dried.

Preparation of the Test Screws:

The screws are degreased in an alkaline medium at 80° C., then rinsed with water and dried before being shot-blasted.

Application of the Coating to the Test Parts and Weight of the Coating:

Clean test screws are typically coated by dipping them into the coating composition, removing and draining excess composition from it, sometimes with moderate shaking. Clean test panels are typically coated by application to the Conway bar. The test parts are then subjected to immediate curing (180° C. to 310° C.) or drying at room temperature or pre-curing at a moderate temperature until the coating is dry to the touch and then cured (180° C. to 310° C.). The coating weights (g/m$^2$) are determined by comparative weighing before and after coating.

Corrosion Resistance Test—Hours of Salt Spray Resistance:

Salt spray tests are conducted according to ISO9227 (May 2012). A score of 10 corresponds to 0 traces of red rust on the part. A score of 9 corresponds to: 1 to 10 localized spots of red rust.

Comparative Example 1: Freeze-Drying of a Sol/Gel Binder Matrix Obtained from Precursors Based Solely on Si 350 mL of binders of different compositions, LC1 to LC5, was successively lyophilized, after prior freezing in liquid nitrogen, in a 1-liter round-bottom flask. The freeze-drying operation, carried out at −80° C. and at a pressure of between 0.1 mbar and 0.26 mbar, took 24 h to obtain a dehydrated solid or liquid. The binders LC1 and LC3 underwent two successive freeze-dryings of 24 hours.

Compositions LC3 to LC5 were distilled prior to freeze-drying to remove residual ethanol and water/ethanol azeotrope from the monomer reactions by evaporation, and water was then added to obtain the same amount of final dry matter.

The powders and viscous liquids obtained were stored for 1 month at room temperature and atmospheric pressure.

The composition of binders LC1 to LC5 is given in the following table (% by mass introduced* compared to the total initial weight):

TABLE 1

|  | LC1 | LC2 | LC3 | LC4 | LC5 |
| --- | --- | --- | --- | --- | --- |
| Glycidoxypropyltriethoxysilane | 26 | 26 | 26 | 26 | 26 |
| Tetraethyl orthosilicate | 6.5 | 6.5 | 6.5 | 6.5 | 6.5 |
| Dipropylene glycol | 0 | 10 | 0 | 5 | 10 |
| Water | 67.5 | 57.5 | 67.5 | 62.5 | 57.5 |
| Evaporation step before freeze-drying | no | no | yes | yes | yes |
| Mass % of residual ethanol before freeze-drying after reaction of monomers | 19 | 18 | 3 | 2.5 | 2 |

*The levels given in Table 1 are the levels initially introduced into the mixture. Indeed, some of the constituents introduced can or will react with each other, at least partially, during the various stages of manufacture of the composition, or during subsequent baking, thus modifying the composition as it is prepared at the outset. This also applies to Tables 2, 6 and 8.

Rehydration tests of binders LC1 and LC3, without dipropylene glycol, were then attempted without success. The resulting Si binder powder is not rehydratable. In binders comprising dipropylene glycol, LC2, LC4 and LC5, a more or less viscous liquid is obtained. This is dilutable with water but leads to an unstable polymer. Indeed, GPC graphs show a lack of molecular weight stability.

It should be noted that regardless of the mass content of residual ethanol before freeze-drying, freeze-drying is feasible.

Example 1: Freeze-Drying of a Sol/Gel Binder Matrix Obtained from Si and Ti Based Precursors, Enriched with Ti 350 mL of binders of different compositions, LI1 to L12, were successively lyophilized, after prior freezing in liquid nitrogen, in a 1-liter round-bottom flask. The freeze-drying operation, carried out at −80° C. and at a pressure of between 0.1 mbar and 0.26 mbar, took 24 h to obtain a solid which was subsequently ground into a fine powder with a particle size ranging from about 2 µm to a few mm.

Compositions LI1 and L12 were subjected to distillation prior to freeze-drying in order to remove by evaporation the residual ethanol and water/ethanol azeotrope resulting from the monomer reactions, and water was then added in order to obtain the same amount of final dry matter.

The powders obtained were stored for 2 to 3 weeks at room temperature and atmospheric pressure.

The composition of the binders LI1 and L12 is given in the following table (% by mass introduced in relation to the initial total weight):

TABLE 2

|  | LI1 | LI2 |
| --- | --- | --- |
| Glycidoxypropyltriethoxysilane | 22.2 | 22.2 |
| Tetra-isopropoxytitanate | 22.2 | 22.2 |
| Dipropylene glycol | 0 | 5 |
| Water | 54.6 | 49.6 |
| Additive | 1 | 1 |

In LI1 or L12, the Ti/Si molar ratio is 50/50. Before freeze-drying, the dry matter content is 22% by weight.

The powder from the binder LI2, the initial composition of which contains dipropylene glycol, was then easily rehydrated at a stirring speed of about 300 to 500 rpm by adding demineralized water, so as to obtain a liquid with the same dry matter by weight as the initial liquid composition. The binder thus obtained is called LI'2.

The rehydration of the powder from the binder LI1, which did not initially contain dipropylene glycol, took longer. The resulting binder is called LI'1

After rehydration, the GPC spectra of the binders LI'1, LI'2 are equivalent to those of the binders LI1, LI2: the molecular weights are stabilized.

Baths were made either with the binder LI2 or with the binder LI'2 (B2 and B'2 respectively), with the addition of 28.4% by weight of dry zinc and 1.87% by weight of Alu Chromel VIII® powder marketed by Eckart Werke (Al dry matter: 80% by weight), based on the total weight of the bath, additives, and water as solvent. The dry matters of baths B2 and B'2 are 39%.

The stability of the baths B2/B'2 after one month of storage at 20° C. is equivalent, as shown in the following table:

TABLE 3

|  | B2 | B'2 |
| --- | --- | --- |
| Viscosity DIN4 (dry) at 30 days, 20° C. | 35 | 36 |
| pH, at 30 days, 20° C. | 9 | 9 |

The binders LI2 and LI'2 were used for the preparation of anti-corrosion coatings (dry film), respectively CR2 and CR'2. The composition of the anti-corrosion coating (dry film) is given in the following table (theoretical mass %* in relation to the total weight):

TABLE 4

|  | CR2 | CR'2 |
| --- | --- | --- |
| Binder L2 | 19 | 0 |
| Binder L'2 | 0 | 19 |
| Zn | 70.7 | 70.7 |
| Al | 3.7 | 3.7 |
| Additives | 6.6 | 6.6 |

*The percentages by weight given in this Table 4 correspond to the percentages by weight calculated considering that the dry matter of the binder is 22% by weight and that only non-volatile additives are counted.

The salt spray resistance performances obtained are similar, as shown in the following table:

TABLE 5

|  | CR2 | CR'2 |
| --- | --- | --- |
| Coating thickness (µm) | 11 | 11.5 |
| Salt spray resistance (hours) at t = 0 Note 10/9 | 504/ 840 | 336/ 552 |

Example 2: Freeze-Drying of a Sol/Gel Binder Matrix Obtained from Si and Ti Based Precursors, Enriched with Ti 250 mL of binders of different compositions, LI3, LI4, LI5 and LI6, was successively lyophilized, after prior freezing in liquid nitrogen, in a 1-liter round-bottom flask. The freeze-drying drying operation, carried out at −80° C. and at a pressure of between 0.1 mbar and 0.26 mbar, took 24 h to obtain a solid which was subsequently ground into a fine powder with a particle size ranging from about 2 µm to a few mm.

The compositions LI3 to LI6 were subjected to distillation prior to freeze-drying in order to remove by evaporation the residual ethanol and water/ethanol azeotrope resulting from the monomer reactions, and water and 1 to 5% solvent (DPG/EL/CCU) were then added to obtain the same amount of final dry matter.

The powders obtained were stored for 2 days at room temperature and atmospheric pressure.

The composition of the binders LI3, LI4, LI5 and LI6 is given in the following table (% by mass introduced in relation to the initial total weight):

TABLE 6

|  | LI3 | LI4 | LI5 | LI6 |
|---|---|---|---|---|
| Glycidoxypropyltriethoxysilane | 22.2 | 22.2 | 22.2 | 22.2 |
| Tetra-isopropoxytitanate | 22.2 | 22.2 | 22.2 | 22.2 |
| Dipropylene glycol (DPG) | 1 | 3 | 0 | 0 |
| Ethyl lactate (EL) | 0 | 0 | 0 | 5 |
| Choline chloride urea (CCU) | 0 | 0 | 5 | 0 |
| Water | 53.6 | 51.6 | 49.6 | 49.6 |
| Additive | 1 | 1 | 1 | 1 |

In LI3 or LI4 or LI5 or LI6, the Ti/Si molar ratio is 50/50. Before freeze-drying, the dry matter content is 22% by weight.

The powders from the binder LI3 or LI4 or LI5 or LI6 were then easily rehydrated at a stirring speed of about 300 to 500 rpm by adding demineralized water, so as to obtain a liquid with the same dry matter by weight as the starting liquid composition. The binders thus obtained are called LI'3, LI'4, LI'5, LI'6, respectively. After rehydration, the GPC spectra of the binders LI'3, LI'4, LI'5, LI'6 are equivalent to those of the binders LI'3, LI4, LI5, LI6: the molecular weights are stabilized.

The binders LI3, LI4, LI5, LI6, LI'3, LI'4, LI'5, LI'6 are used to make baths with the same composition as in Example 1, the binders LI2 or LI'2 being replaced by the binders in this example.

The stability of the baths after one month's storage at 20° C. is equivalent whether the binder used is an initial binder (LI3, LI4, LI5) or a binder obtained by the process according to the invention (LI'3, LI'4, LI'5). Baths made from the binder LI6 are not stable whereas they are stable when the binder is LI'6.

The binders LI3, LI4, LI'3, LI'4, LI'6 were used for the preparation of anti-corrosion coatings, respectively CR3, CR4, CR'3, CR'4, CR'6, of the same composition as in Example 1, the binders LI2 or LI'2 being replaced by the binders of this example. The salt spray performance obtained is at least equivalent, as shown in the following table:

TABLE 7

|  | CR3 | CR4 | CR'3 | CR'4 | CR'6 |
|---|---|---|---|---|---|
| Coating thickness (μm) | 8.7 | 9.3 | 8.1 | 9.9 | 9.5 |
| Salt spray resistance (hours) at t = 1 month, 20° C. Note 10/9 | 24/240 | 120/168 | 912/984 | 120/1584 | 1344/1344 |

Example 3: Freeze-Drying of a Sol/Gel Binder Matrix Obtained from Si and Ti Based Precursors 0.8 liter of binder LI7, distributed in 3 round-bottom flasks, and 1 liter of binder LI8, distributed in 4 flasks, were successively freeze-dried, after prior freezing in liquid nitrogen, in a 1 liter flask. The freeze-drying operation, carried out at −80° C. and at a pressure of between 0.1 mbar and 0.26 mbar, required 24 h to obtain a dehydrated solid/gel.

The compositions LI7 and LI8 were distilled prior to freeze-drying to remove by evaporation the residual ethanol and water/ethanol azeotrope from the monomer reactions, and water was then added to obtain the same amount of final dry matter.

The powders obtained were stored for 5 days at room temperature and atmospheric pressure.

The composition of the binders LI7 and LI8 is given in the following table (% by mass introduced in relation to the total initial weight):

TABLE 8

|  | LI7 | LI8 |
|---|---|---|
| Glycidoxypropyltriethoxysilane | 28 | 28 |
| Tetra Ethoxytitanate | 9.5 | 9.5 |
| Tetraethyl orthosilicate | 1.5 | 1.5 |
| Dipropylene glycol | 5.4 | 12.0 |
| Water | 55.6 | 49.0 |

In LI7 or LI8, the Ti/Si molar ratio is 28/72. Before freeze-drying, the solids content is 22% by weight.

The soft solid from the binder LI8 hardens over time. It was then rehydrated by adding demineralized water at a temperature of 40° C. to 60° C. and under stirring, so as to obtain a liquid (LI'8) with the same dry matter by weight as the starting liquid composition.

The solid from the binder LI7 containing half as much dipropylene glycol rehydrates significantly slower, even at a temperature of 40° C. to 60° C.

It can therefore be seen that the addition of heavy organic solvent to the initial aqueous composition with a lower molar amount of titanate facilitates subsequent rehydration.

Example 4: Vacuum Evaporation of a Sol/Gel Binder Matrix Obtained from Si and Ti Based Precursors 3640 g of the binder LI7, as described in Example 3 but not previously distilled, was evaporated in an Erlenmeyer flask for 12.5 hours under vacuum (20 mbar) at a water bath temperature of 40° C.-45° C. to obtain a dehydrated solid/gel.

The soft solid from the binder LI7 hardens over time. It was then rehydrated after storage for 1 day at room temperature and atmospheric pressure by adding a mixture of demineralized water and dipropylene glycol (6.5% by weight of dipropylene glycol based on the total weight of the demineralized water/dipropylene glycol mixture) in 7 days at 20° C., so as to obtain a liquid with the same dry matter by weight as the starting liquid composition. The binder thus obtained with a composition identical to LI'8 is called LI"8.

After rehydration, the GPC spectrum of the binder LI"8 is equivalent to that of the binder LI8: the molecular weights are stabilized.

The binders LI8, LI"8 are used to make baths by adding 28.4% by weight of dry zinc and 1.87% by weight of Alu Chromel VIII® powder marketed by Eckart Werke, based on the total weight of the bath, additives and water as a solvent. The dry matters of the baths B3 and B'3 are 41.6 and 41.3% respectively.

The stability of the baths after one month's storage at 20° C. is equivalent whether the binder used is an initial binder (LI8) or a binder obtained by the process according to the invention (LI"8).

The binders LI8 and LI"8 were used for the preparation of anti-corrosion coatings, CR8 and CR"8 respectively. The composition of the anti-corrosion coating (dry film) is given in the following table (theoretical mass %* in relation to the total weight):

TABLE 9

|  | CR8 | CR"8 |
|---|---|---|
| Binder L8 | 26.2 | 0 |
| Binder L"8 | 0 | 26.2 |
| Zn | 61.6 | 61.6 |
| Al | 3.3 | 3.3 |
| Additives | 8.9 | 8.9 |

*The percentages by weight given in this Table 9 correspond to the percentages by weight calculated considering that the dry matter of the binder is 22% by weight and that only non-volatile additives are counted.

The salt spray resistance performances obtained are similar, as shown in the following table:

TABLE 10

|  | CR8 | CR"8 |
|---|---|---|
| Panel | | |
| Coating weight (g/m²) | 27.4 | 27.7 |
| Salt spray resistance (hours) at t = 0 Note 10 | 1392 | 792 |
| Screw | | |
| Coating weight (g/m²) | 23.6 | 25.4 |
| AS IS | 1512 | 1224 |
| CTV (mechanical shocks) | 1056 | 1344 |
| Cth (Thermal shock: 96 h at 180° C.) | 1512 | 1512 |
| CTV + Cth (mechanical and thermal shock) | 1176 | 624 |

Example 5: Vacuum Evaporation of a sol/gel Binder Matrix Obtained from Si and Ti Precursors, Enriched with Ti 1 to 2 kg of binder LI3 or LI4 or LI5, as described in Example 2, was evaporated for about 2.5 to 4 h under vacuum (20 mbar) in the rotary evaporator at 100 rpm at a water bath temperature of 40° C. to obtain a solid that can be finely ground.

The powders from the binder LI3 or LI4 or LI5 or LI6 were then easily rehydrated at a stirring speed of about 300 to 500 rpm by adding demineralized water, so as to obtain a liquid with the same dry matter by weight as the starting liquid composition. The binders thus obtained are respectively named LI"3, LI"4, LI"5, LI"6.

After rehydration, the GPC spectra of the binders LI"3, LI"4, LI"5, LI"6 are equivalent to those of the binders LI3, LI4, LI5, LI6: the molecular weights are stabilized.

The binders LI3, LI4, LI5, LI6, LI"3, LI"4, LI"5, LI"6 are used to make baths with the same composition as in Example 1, the binders LI2 or LI'2 being replaced by the binders in this example.

The stability of the baths after one month's storage at 20° C. is equivalent whether the binder used is an initial binder (LI3, LI4, LI5) or a binder obtained by the process according to the invention (LI"3, LI"4, LI"5). Baths made from the binder LI6 are not stable whereas they are stable when the binder is LI"6

The binders LI4, LI"4, LI"6 were used for the preparation of anti-corrosion coating compositions, respectively CR4, CR"4, CR"6, of the same composition as given in Example 1, the binders LI2 or LI'2 being replaced by the binders of this example. The salt spray performance obtained is given in the following table:

TABLE 11

|  | CR4 | CR"4 | CR"6 |
|---|---|---|---|
| Coating thickness (μm) | 9.6 | 9.9 | 9.6 |
| Salt spray resistance (hours) at t = 1 month, 20° C. Note 10/9 | 120/ 336 | 120/ 624 | 624/ 1056 |

The invention claimed is:

1. A solid composition, intended for the preparation of an aqueous composition, comprising a binder based on silane and at least one of a titanate precursor and a zirconate precursor, wherein
    the solid composition is water-hydratable,
    wherein the silane carries at least one function hydrolyzable to a hydroxyl function, and the solid composition has a Ti/Si molar ratio ranging from 10/90 to 60/40;
    wherein the solid composition is obtained by a process comprising a step of dehydrating an aqueous composition comprising the at least one of the titanate precursor and/or the zirconate precursor, and the silane carrying at least one function hydrolysable to a hydroxyl function having the Ti/Si molar ratio ranging from 10/90 to 60/40;
    wherein the aqueous composition further comprises a heavy organic solvent, an ionic liquid, or mixtures thereof, wherein the silane additionally carries an epoxy function.

2. The solid composition of claim 1, wherein the silane is selected from epoxy-functional di- or trimethoxysilane and epoxy-functional di- or triethoxysilane, as well as mixtures thereof.

3. The solid composition of claim 2, wherein the silane is selected from beta-(3,4-epoxycyclohexyl)ethyl-trimethoxysilane, 4-(trimethoxysilyl)butane-1,2-epoxide, gamma-glycidoxypropyltrimethoxysilane, gamma-glycidoxypropyltriethoxysilane, and mixtures thereof.

4. The solid composition of claim 1, wherein the Ti/Si molar ratio varies from 20/80 to 50/50.

5. The solid composition of claim 1, wherein the composition is in powdered form, with a particle size ranging from 2 μm to 3 mm.

6. The solid composition of claim 1, wherein the titanate precursor is an organic titanate and the zirconate precursor is an organic zirconate.

7. The solid composition of claim 1, wherein the binder is further based on a silicate, and the solid composition is obtained by dehydration of an aqueous composition comprising the at least one of the titanate precursor and the zirconate precursor, the silane, the silicate, and water.

8. The solid composition of claim 1, wherein the Ti/Si molar ratio varies from 25/75 to 50/50.

9. The solid composition of claim 6, wherein the organic titanate is selected from $C_1$-$C_8$ tetraalkyl titanates, and the organic zirconate is selected from $C_1$-$C_8$ tetraalkyl zirconates.

10. The solid composition of claim 9, wherein the silane is selected from beta-(3,4-epoxycyclohexyl)ethyl-trimethoxysilane, 4-(trimethoxysilyl)butane-1,2-epoxide, and mixtures thereof.

11. The solid composition of claim 1, further comprising a silane is selected from the group consisting of octyltriethoxysilane, phenyltriethoxysilane, methyltriethoxysilane, (2-diethylphosphatoethyl) triethoxy silane, vinyltriethoxysilane, 3-aminopropyltriethoxysilane, methyl methacrylate trimethoxysilane, methyl methacrylate triethoxysilane and mixtures thereof.

12. A solid composition, intended for the preparation of an aqueous composition, comprising a binder based on silane, silicate, and at least one of a titanate precursor and a zirconate precursor, wherein the solid composition is water-hydratable, wherein the silane carries at least one function hydrolyzable to a hydroxyl function, and the solid composition has a Ti/Si molar ratio ranging from 10/90 to 60/40;

wherein the solid composition is obtained by a process comprising a step of dehydrating an aqueous composition comprising the at least one of the titanate precursor and the zirconate precursor, and the silane carrying at least one function hydrolysable to a hydroxyl function having the Ti/Si molar ratio ranging from 10/90 to 60/40;

wherein the aqueous composition further comprises a heavy organic solvent, an ionic liquid, or mixtures thereof.

13. The solid composition of claim 12, wherein the silicate is a silicon alkoxide.

14. The solid composition of claim 12, wherein the Ti/Si molar ratio varies from 20/80 to 50/50.

15. The solid composition of claim 12, wherein the composition is in powdered form, with a particle size ranging from 2 μm to 3 mm.

16. The solid composition of claim 12, wherein the titanate precursor is an organic titanate and the zirconate precursor is an organic zirconate.

17. The solid composition of claim 16, wherein the organic titanate is selected from $C_1$-$C_8$ tetraalkyl titanates, and the organic zirconate is selected from $C_1$-$C_8$ tetraalkyl zirconates.

18. The solid composition of claim 17, wherein the silane is selected from beta-(3,4-epoxycyclohexyl)ethyltrimethoxysilane, 4-(trimethoxysilyl)butane-1,2-epoxide, gamma-glycidoxypropyltrimethoxysilane, gamma-glycidoxypropyltriethoxysilane, octyltriethoxysilane, phenyltriethoxysilane, methyltriethoxysilane, (2-diethylphosphatoethyl) triethoxy silane, vinyltriethoxysilane, 3-aminopropyltriethoxysilane, methyl methacrylate trimethoxysilane, methyl methacrylate triethoxysilane and mixtures thereof.

19. The solid composition of claim 12, obtained by dehydration of an aqueous composition comprising the at least one of the titanate precursor and the zirconate precursor, the silane, the silicate, and water.

20. The solid composition of claim 12, wherein the Ti/Si molar ratio varies from 25/75 to 50/50.

* * * * *